United States Patent
Beardsall

(10) Patent No.: US 10,676,262 B2
(45) Date of Patent: Jun. 9, 2020

(54) SEALING LABEL AND SNUFF CONTAINER WITH A SEALING LABEL

(71) Applicant: Swedish Match North Europe AB, Stockholm (SE)

(72) Inventor: Philip Beardsall, Örkelljunga (SE)

(73) Assignee: Swedish Match North Europe AB, Stockholm (SE)

( * ) Notice: Subject to any disclaimer, the term of this patent is extended or adjusted under 35 U.S.C. 154(b) by 217 days.

(21) Appl. No.: 15/190,050

(22) Filed: Jun. 22, 2016

(65) Prior Publication Data

US 2017/0369223 A1 Dec. 28, 2017

(51) Int. Cl.
| | |
|---|---|
| *B65D 55/06* | (2006.01) |
| *G09F 3/03* | (2006.01) |
| *B65C 3/16* | (2006.01) |
| *B32B 15/08* | (2006.01) |
| *B65D 55/08* | (2006.01) |

(52) U.S. Cl.
CPC .............. *B65D 55/06* (2013.01); *B32B 15/08* (2013.01); *B65C 3/166* (2013.01); *B65D 55/0818* (2013.01); *G09F 3/0341* (2013.01)

(58) Field of Classification Search
CPC .... B65D 77/36; B65D 55/0818; B65D 55/06; G09F 3/0341; G09F 2003/0251; A24F 23/00; B65C 3/166; B32B 15/08; B32B 3/266; B32B 27/08; Y10T 428/14; B42D 5/002
USPC .............................. 206/247; 40/306, 628, 670
See application file for complete search history.

(56) References Cited

U.S. PATENT DOCUMENTS

| | | | |
|---|---|---|---|
| 3,873,018 A | 3/1975 | Donnay | |
| 4,357,383 A * | 11/1982 | Howden | ................. B32B 15/08 428/213 |
| 9,468,233 B2 * | 10/2016 | Macko | ................... A24B 13/00 |

(Continued)

FOREIGN PATENT DOCUMENTS

| | | |
|---|---|---|
| EP | 2 248 736 B1 | 11/2010 |
| EP | 2 551 212 B1 | 1/2013 |

(Continued)

OTHER PUBLICATIONS

International Search Report for International Application No. PCT/EP2017/064911 dated Aug. 8, 2017.

*Primary Examiner* — Anthony D Stashick
*Assistant Examiner* — James M Van Buskirk
(74) *Attorney, Agent, or Firm* — Knobbe Martens Olson & Bear LLP

(57) ABSTRACT

A sealing label for sealing a snuff container may include a structural layer and having first and second side edges extending in a length direction and first and second end edges extending in a width direction. The sealing label may be divided in the width direction into a container lid attachment area and a container base attachment area. A tear strip area may be arranged between the container lid attachment area and the container base attachment area and may be terminated by a pull tab arranged at the first end edge. The structural layer of the sealing label may be a single structural layer of the sealing label and may consist of a mono oriented polymer film having a direction of orientation coinciding with the length direction of the sealing label. A snuff container provided with the sealing label is also disclosed.

14 Claims, 3 Drawing Sheets

(56) References Cited

U.S. PATENT DOCUMENTS

| | | | | |
|---|---|---|---|---|
| 2004/0177535 A1* | 9/2004 | Pawlik | .................... | B65C 3/166 |
| | | | | 40/311 |
| 2005/0103789 A1 | 5/2005 | O'Hara | | |
| 2007/0130811 A1 | 6/2007 | Shevelev et al. | | |
| 2014/0262903 A1* | 9/2014 | Mitten | .................... | B65D 55/06 |
| | | | | 206/459.5 |

FOREIGN PATENT DOCUMENTS

| | | | | |
|---|---|---|---|---|
| GB | 158 342 | 1/1921 | | |
| WO | WO 2007/067953 A2 | 6/2007 | | |
| WO | WO 2013/024284 A1 | 2/2013 | | |
| WO | WO-2013024283 A1 * | 2/2013 | ......... | B65D 55/0818 |
| WO | WO 2014/150988 A1 | 9/2014 | | |
| WO | WO 2015/104420 | 7/2015 | | |

\* cited by examiner

SEALING LABEL AND SNUFF CONTAINER WITH A SEALING LABEL

BACKGROUND

Field

The invention pertains to a sealing label for sealing a snuff container and to a snuff container being provided with the sealing label. The sealing label comprises a structural layer and has first and second side edges extending in a length direction and first and second end edges extending in a width direction. The sealing label is divided in the width direction into a container lid attachment area, a container base attachment area and a tear strip area arranged between the container lid attachment area and the container base attachment area. The tear strip area is terminated by a pull tab which is arranged at the first end edge. The sealing label has a length which considerably exceeds the width of the sealing label.

Description of the Related Art

Orally used smokeless tobacco products and non-tobacco products, referred to herein as "snuff" or "snuff products" are generally packaged in small handy containers, each container being designed to contain several portions of unused snuff and optionally including a disposal compartment for temporary storage of used snuff. The containers are pocket sized and may be carried by a user in a pocket or a handbag until all the fresh snuff products packaged in the container have been used after which the emptied container may be discarded and replaced with a new container with unused snuff products. A concern when packaging snuff products is to make the containers sufficiently tight to preserve the flavor and aroma of the snuff product and to protect the snuff product from drying out during transport and storage up until a first opening of the snuff container by a user. To this end, it is common to apply an inner sealing member over the access opening in a snuff container. The sealing member may take the form of a film or foil which is torn away and removed by the user to gain a first access to the snuff product packaged in the container. The sealing member is provided as a transport seal in addition to a re-closable lid.

To further improve sealing of a snuff container and to provide tamper evidence, snuff containers may be provided with a fully or partly removable sealing label which is applied over a split-line between a container lid and a container base. The sealing label may be printed and/or pigmented and may be used for conveying product information, logos, warning text, etc.

A tamper-evident label for a snuff container is disclosed in WO 2013/024284 A1. The label in WO 2013/024284 A1 is divided into an upper part which is attached to a container lid and a lower part which is attached to a container base. The upper part of the label is torn away to allow the lid to be detached from the base.

Another sealing label for a snuff container is disclosed in WO 2014/150988 A1. The label in WO 2014/150988 A1 is a laminate of an inner web and an outer web and is provided with a tear strip which is defined by weakened portions such as score lines or cuts formed in the inner web. The label is applied to a container and forms a seal between the lid and the base. The tear strip is torn away through the outer web of the label to allow the lid to be separated from the base.

WO 2015/104420 A1 discloses a label similar to that in WO 2014/150988 A1 and comprises a tear strip which is torn away through an outer layer in a two-layer label.

Tamper evident labels which are fully or substantially fully removed when opening a snuff container are disclosed in EP 2 248 736 B1, EP 2 551 212 B1 and WO 2007/067953 A2.

SUMMARY

It is an object of the present disclosure to offer a simplified and highly functional sealing label for a snuff container. Another object of the present disclosure is to provide a snuff container having a simplified and highly functional sealing label. In addition to a simplified construction, the label may provide one or more further functional advantages such as improved sealing capacity and a large information conveying area. One or more of the above objects may be achieved with a sealing label for a snuff container, in accordance with the present disclosure.

In some implementations, a sealing label for sealing a snuff container includes a structural layer and having first and second side edges extending in a length direction and first and second end edges extending in a width direction. The sealing label may be divided in said width direction into a container lid attachment area, a container base attachment area and a tear strip. The tear strip area may be arranged between said container lid attachment area and said container base attachment area. The strip area may terminate at a pull tab arranged at said first end edge. The sealing label may have a length in said length direction and a width in said width direction. A ratio between said length and said width may be between 7 and 25. The structural layer may include a mono oriented polymer film having a direction of orientation coinciding with said length direction of said sealing label. Said structural layer may include a single structural layer of said sealing label.

In some implementations, a snuff container includes a sealing label. The snuff container may have a height in a height direction and having a circumference in a circumferential direction in a plane perpendicular to said height direction. The snuff container may include a container base having a bottom wall and a base side wall and a container lid having a top wall and a lid side wall. The container lid may be removably attached to said container base with an outer surface of said lid side wall aligned with an outer surface of said base side wall. A split-line may be arranged between a lower edge of said lid side wall and an upper edge of said base side wall. The split-line may extend in said circumferential direction of said snuff container.

The sealing label may be attached to said snuff container with said length direction of said sealing label coinciding with said circumferential direction of said snuff container and with said height direction of said snuff container coinciding with said width direction of said sealing label and with said container lid attachment area of said sealing label being attached to said lid side wall and with said container base attachment area being attached to said base side wall and with said tear strip area completely or substantially completely covering said split line between said lower edge of said lid side wall and said upper edge of said base side wall.

The sealing label for sealing a snuff container as disclosed herein may include a structural layer and has first and second side edges extending in a length direction and first and second end edges extending in a width direction. The sealing label may be divided in the width direction into a container lid attachment area, a container base attachment area and a tear strip area arranged between the container lid attachment area and the container base attachment area. The tear strip area may be terminated by a pull tab arranged at the first end edge of the sealing label. The sealing label may have a length in the length direction and a width in the width direction and a ratio between the length and the width which is from 7 to 25. The structural layer which may be a single structural layer of the sealing label that includes or consists of a mono oriented polymer film having a direction of orientation coinciding with the length direction of the sealing label.

The sealing label may have a length which considerably exceeds the width which means that the sealing label is a narrow elongated film strip, the lid attachment area, the container base attachment area and the tear strip area extending in the length direction of the sealing label along the full length of the sealing label.

The single structural layer may preferably be a moisture proof and more preferably also a gas tight mono-oriented polymer film. Suitable polymers may be polyolefins such as polypropylene, and polyethylene. The mono-oriented film may have a preferential tear direction coinciding with a main direction of orientation of the polymer chains in the mono-oriented polymer film and is arranged with the preferential tear direction coinciding with the length direction of the sealing label. The mono-oriented polymer film may tear in a controlled manner in the preferential tear direction, which means that the sealing label as disclosed herein does not have to be provided with pre-formed tear lines in the structural layer.

Such preformed tear lines are conventionally arranged as weakened portions in a structural layer, such as lines of perforations, slits, thinned lines, etc. When applying a sealing label provided with pre-formed tear lines delimiting a tear-strip area defined between the tear lines to a snuff container, careful alignment of the tear-strip area with a split-line between the container lid and the container base is required. Moreover, perforations arranged in a structural layer are detrimental to the tightness of the seal between the label and the snuff container. To improve tightness of such previously known sealing labels, they are constituted by laminates comprising a perforated structural layer and an additional non-perforated structural sealing layer.

The mono-oriented polymer films as used herein are relatively thin polymer films with a thickness which may be in the range of from 30 (micrometers) to 100 µm. Suitable films are available e.g. from Avery Denison Corporation, Glendale, Calif. and UPM Raflatac, Tampere, Finland.

As disclosed herein, an adhesive coating may be applied to a rear surface of the structural layer covering the container lid attachment area and the container base attachment area. Alternatively, the adhesive coating may be applied to a snuff container to which the sealing label is applied. The adhesive coating is arranged to provide non-removable attachment of the container lid attachment area and the container base attachment area to a container lid and a container base, respectively. By non-removable attachment as used herein is implied that the container lid attachment area and the container base attachment area of the sealing label may not be peeled away from a lid or a base to which the label area is attached without tearing or otherwise destroying or damaging the label.

The adhesive coating is preferably applied as a continuous layer of adhesive on the container lid attachment area and the container base attachment area to provide a tight seal between the sealing label and the container. A continuous adhesive coating may provide a better seal between the sealing label and a container wall than a discontinuous coating and may enhance tightness of a sealed snuff container, thereby keeping the packaged contents in the snuff container fresh for a longer period of time. The adhesive may be any suitable adhesive as known in the art which is compatible with the label material and with the material of the snuff container and which provides a sufficient attachment force between the sealing label and the snuff container to prevent the sealing label to be peeled off from the snuff container.

The rear surface of the structural layer may be free from adhesive coating within the tear strip area or the adhesive coating may have been rendered non-adhesive or "deadened" within the tear strip area. Deadening of an adhesive coating may be performed e.g. by applying a non-adhesive coating layer over the adhesive coating.

The length of the sealing label may be from 80 millimeters to 250 millimeters and the width of the sealing label may be from 10 millimeters to 25 millimeters, such as from 15 millimeters to 22 millimeters or from 16 millimeters to 19 millimeters.

Tear initiation cuts may be arranged in the structural layer on each side of the pull tab at the first end edge. The distance between the tear initiation cuts corresponds to the width of the tear strip area.

The tear strip area may constitute from 2% to 20% of a combined area of the tear strip area, the lid attachment area and the base attachment area, such as from 5% to 15% of a combined area of the tear strip area, the lid attachment area and the base attachment area or from 7% to 10% of a combined area of the tear strip area, the lid attachment area and the base attachment area. The width of the tear strip area may be from 0.3 millimeters to 3 millimeters, such as from 0.5 millimeters to 2.5 millimeters or from 0.6 millimeters to 1.5 millimeters. The tear strip area is the part of the sealing label which is torn away and removed when opening a snuff container which has been sealed by a sealing label as disclosed herein. A narrow tear strip area leaves a considerable part of the sealing label remaining on the snuff container which means that most of the surface of the sealing label can be used for conveying information and/or for decorative purposes throughout the useful lifespan of the snuff container. By using a single-layer polymer film as a sole structural layer in a sealing label as disclosed herein, not only is material consumption reduced as compared to conventional dual-layer labels but it has also surprisingly been found that the tear strip area may be made narrower than in a conventional dual-layer label.

A snuff container as disclosed herein comprises a sealing label as disclosed herein. The snuff container has a height direction and a circumferential direction in a plane perpendicular to the height direction and comprises a container base having a bottom wall and a base side wall and a container lid having a top wall and a lid side wall. The container lid is removably attached to the container base with an outer surface of the lid side wall aligned with an outer surface of the base side wall. A split-line is arranged between a lower edge of the lid side wall and an upper edge of the base side wall and extends in the circumferential direction of the snuff container. The sealing label is attached to the snuff container with the length direction of the sealing label coinciding with the circumferential direction of the snuff container and with the height direction of the snuff container coinciding with the width direction of the sealing label. The container lid attachment area of the sealing label is attached to the lid side wall and the container base attachment area is attached to the base side wall and the tear strip area completely or substantially completely covers the split line between the lower edge of the lid side wall and the upper edge of the base side wall.

As the sealing label is free from perforations or cuts, with the possible exception of tear initiation cuts arranged at either side of the pull tab, the sealing strip provides the snuff container with a very good and tight transport seal. The non-perforated and preferably moisture and gas-tight sealing strip may keep the packaged snuff product fresh inside the container for a prolonged period of time. It may be possible to achieve sufficient tightness with the sealing label alone and to dispense with an inner removable sealing member covering the access opening in the container base prior to a first opening of the container by a consumer. Furthermore, it may be possible to achieve a prolonged shelf-life for the packaged snuff product without the need for refrigeration.

The width of the tear strip which is removed from the packaging container corresponds to the width of the tear strip area of the sealing label. When removing the tear strip from the packaging container the lower edge of the lid side wall and the upper edge of the base side wall may act as tearing guides promoting accurate tear propagation in the sealing label.

It has surprisingly been found that the tear strip area of the sealing labels as disclosed herein may provide a well-defined tear strip which can readily be removed when opening the sealed snuff container even if the rear surface of the sealing label is fully coated with a continuous layer of adhesive.

The gap between the container lid and the container base which is formed by the split-line between the lower edge of the lid side wall and the upper edge of the base side wall prevents the sealing tape from adhering to the snuff container in the area of the gap. It has been found that even if the tear strip area of the sealing label is slightly wider than the split line such that a thin edge portion of the tear strip area is attached to one or both of the lid side wall and the base side wall, the tear strip may be readily and accurately torn away from the container, leaving the lid attachment area and the base attachment area of the sealing label firmly attached to the lid side wall and the base side wall, respectively. The non-attached part of the tear strip area which is applied over the gap reduces the attachment force between the tear strip and the container and allows the tear strip to be separated from the container lid attachment area and the container base attachment area. The tear strip area which is applied at the split-line between the lower edge of the lid side wall and the upper edge of the base side wall preferably has the same width as the split-line but may be at most 0.7 millimeters wider than the split line such as at most 0.5 millimeters wider than the split line or at most 0.3 millimeters wider than the split line.

It may be preferred that a portion of the sealing label at the first end edge of the sealing label overlaps with a portion of the sealing label at the second end edge of the sealing label to ascertain that a non-broken seal is provided along the full length of the split-line. An overlapping configuration of the sealing label ends may be particularly useful when the sealing label is provided with tear initiation cuts at the pull tab as set out herein. The overlap between the first and second end edges of the sealing strip is preferably as long or at least as long as the tear initiation cuts.

The split-line may have a width in the height direction of the snuff container of from 0.1 to 3 millimeters, such as from 0.5 to 2.5 millimeters, such as from 0.7 to 1.5 millimeters. Very thin split-lines such as split-lines of from 0.1 millimeters to 0.3 millimeters may require that the tear strip area of the sealing layer is non-adhesive or has been rendered non-adhesive, as set out herein.

The width of the sealing label may be from 60% to 100% of the height of the snuff container. A wide sealing label provides a large display area. A wide sealing label may also offer better sealing of the snuff container, in particular in combination with a continuous adhesive coating on the rear surface of the sealing label. A continuous adhesive coating applied at least over the container lid attachment area and the container base attachment area forms a moisture and gas barrier between the sealing label and the snuff container in the width direction of the sealing label.

A large remaining display area remaining after the tear strip area has been removed makes it possible to provide a snuff container with printed matter such as decorative elements, logos, information, etc. which will appear largely unaffected by removal of the tear strip area.

Accordingly, a front surface of the sealing label as disclosed herein may contain a printed feature which extends partly in the lid attachment area and partly in the base attachment area and which will remain visible on the snuff container also after the tear strip has been removed. The parts of the printed feature may have purely decorative purposes or may alternatively or in addition to a decorative purpose serve to convey information and/or to indicate a proper alignment for the container lid and the container base when opening and/or closing the snuff container.

The snuff containers as disclosed herein may have a generally cylindrical shape. The primary function of a snuff container as disclosed herein is to contain fresh ready-to-use snuff products. Accordingly, the bottom wall and the top wall may be disc shaped or have a modified disc shape, such as a non-planar disc shape. Non-planar disc shapes as used herein include profiled shapes comprising embossed or raised profile elements such as figurative elements and/or functional elements. Figurative elements may be symbols, letters, patterns, etc. and functional elements may be stacking elements, a recess for used snuff products, etc.

The snuff containers as disclosed herein are consumer packages having a shape and a size adapted for conveniently carrying the package in a pocket or in a handbag and may be used for packaging any known type of snuff product.

The terms "snuff" and "snuff product" are used herein to refer to any kind of smokeless tobacco products and non-tobacco products for oral use.

A non-tobacco snuff product may be any composition as known in the art for use in the oral cavity and may comprise plant material other than tobacco material, cellulose such as microcrystalline cellulose, fillers, flavorants, and active ingredients such as nicotine, caffeine, etc.

Smokeless tobacco for oral use includes chewing tobacco, dry snuff and moist (wet) snuff. Generally, dry snuff has moisture content of less than 10 wt % (percent by weight) and moist snuff has a moisture content of above 40 wt %. Semi-dry products having between 10% to 40 wt % moisture content are also available.

Smokeless tobacco products for oral use are made from tobacco leaves, such as lamina and stem of the tobacco leaf. The material from roots and stalks are normally not utilized for production of smokeless tobacco compositions for oral use.

There are two types of moist snuff, the American type and the Scandinavian type which is also called snus. American-type moist snuff is commonly produced through a fermentation process of moisturized ground or cut tobacco. Scandinavian-type moist snuff (snus) is commonly produced by using a heat-treatment process (pasteurization) instead of fermentation.

Both the American-type and the Scandinavian-type of moist snuff for oral use are available in loose form or portion-packed in a saliva-permeable, porous wrapper material forming a pouch. Pouched moist snuff, including snus, is typically used by the consumer by placing the pouch between the upper or lower gum and the lip and retaining it there for a limited period of time.

By "tobacco" is meant any part, e.g., leaves, stems, and stalks, of any member of the genus Nicotiana. The tobacco may be whole, shredded, threshed, cut, ground, cured, aged, fermented, or otherwise, e.g., granulated or encapsulated.

"Oral" and "oral use" is in all contexts used herein as a description for use in the oral cavity, such as buccal placement.

As used herein "pouched smokeless tobacco product for oral use" or "oral pouched smokeless tobacco product" refers to a portion of smokeless tobacco packed in a saliva-permeable pouch material intended for oral use.

BRIEF DESCRIPTION OF THE DRAWINGS

The present invention will be further explained hereinafter by means of non-limiting examples and with reference to the appended drawings wherein.

DETAILED DESCRIPTION

It is to be understood that the drawings are schematic and that individual components are not necessarily drawn to scale. It should be understood that the sealing label as disclosed herein may be applied in a corresponding manner to snuff containers having a shape other than the cylindrical shape shown in the figures. Accordingly, the scope of the invention is determined solely by the appended claims.

Although the snuff container shown in the figures is a cylindrical snuff container having circular cross section it is to be understood that the locking arrangement as disclosed herein can be arranged on a snuff container having a non-circular cross section, such as rectangular, near-rectangular, oval or the like. Furthermore, the snuff container may be provided with a disposal compartment for temporary storage of used snuff portions. Such disposal compartment may be arranged in the container lid or in the container base, as is known in the art.

Figure 1:
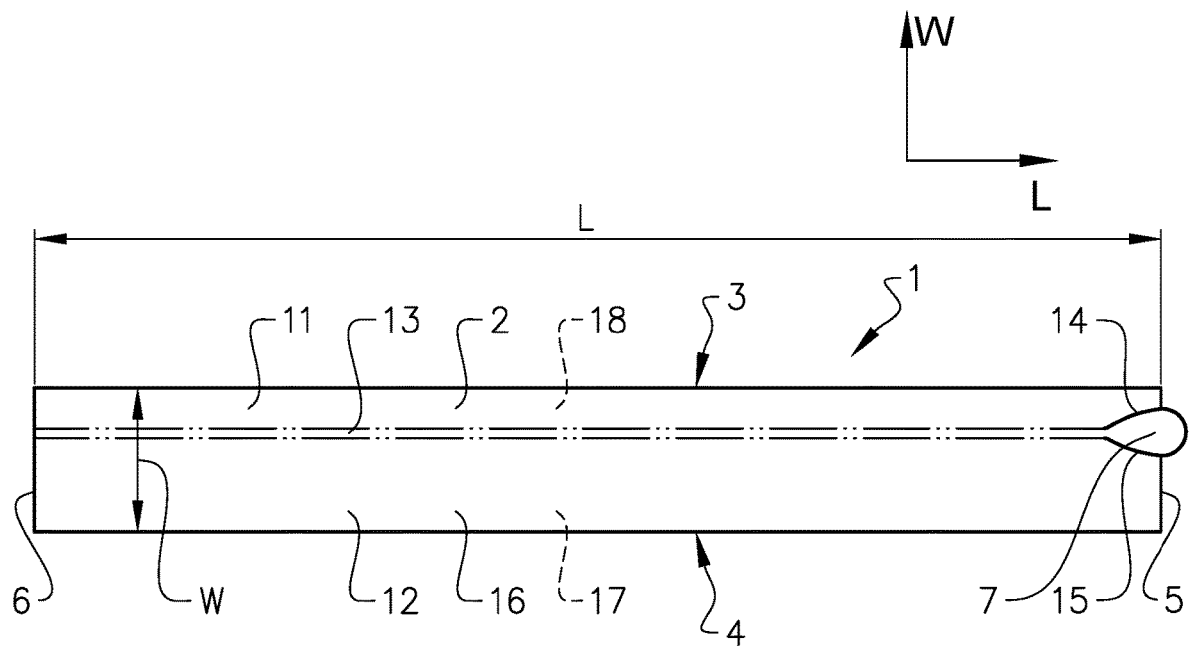
FIG. 1 shows an sealing label as disclosed herein.
Figure 2:
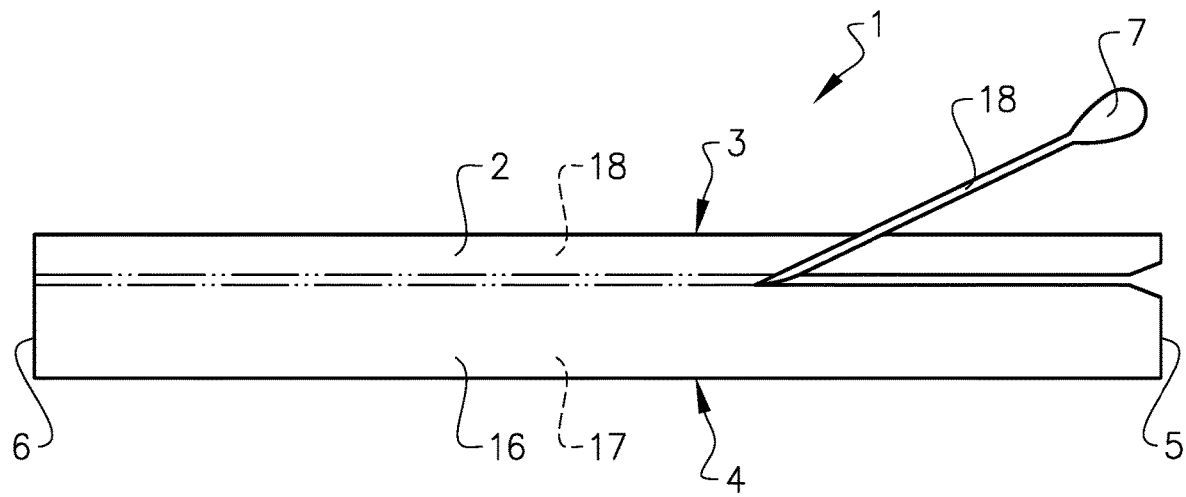
FIG. 2 shows the sealing label of FIG. 1 with a partly torn-away tear-strip.

The sealing label 1 shown in FIGS. 1 and 2 comprises a structural layer 2 and has first and second side edges 3, 4 extending in a length direction L and first and second end edges 5, 6 extending in a width direction W. The sealing label 1 is divided in the width direction W into a container lid attachment area 11, a container base attachment area 12 and a tear strip area 13 arranged between the container lid attachment area 11 and the container base attachment area 12. The tear strip area is terminated by a pull tab 7 arranged at the first end edge 5 of the sealing label 1. The sealing label has a length l in the length direction L and a width w in the width direction W. The length l of the sealing label 1 is considerably larger than the width w such that a ratio l/w between the length l and the width w is from 7 to 25. As set out herein the length l of the sealing label may be from 80 millimeters to 250 millimeters and the width w of the sealing label may be from 10 millimeters to 25 millimeters, such as from 15 millimeters to 19 millimeters.

The structural layer 2 which is the only structural layer of the sealing label 1 consists of a mono oriented polymer film having a direction of orientation coinciding with the length direction L of the sealing label 1. The structural layer 2 is free from perforations or other weakened tear lines.

Tear initiation cuts 14, 15 are arranged in the structural layer on each side of the pull tab 7 at the first end edge. In the shown example, the tear initiation cuts 14, 15 are angled towards the tear strip area 13, providing the pull tab 7 with a tapering shape from the end of the pull tab 7, which is shown as protruding from the first end edge 5 of the sealing label 1. Alternative shapes of the pull tab 7, such as circular, rectangular etc. may be used, as well as tear initiation cuts which are arranged parallel with the length direction L of the sealing label 1, or which are arranged at a smaller or larger angle to the length direction L of the sealing label 1 than shown in the figures. It is also envisaged that the pull-tab 7 may be coterminous with the first end edge 5 of the sealing label 1.

The sealing label 1 has a front surface 16 and a rear surface 17 and a continuous adhesive coating 18 is applied to the rear surface 17 of the structural layer and covers the container lid attachment area 11, the container base attachment area 12 as well as the tear strip area 13. A continuous coating covering the entire rear surface 17 of the sealing label 1 may be preferred e.g. as it allows the sealing label 1 to be produced in a simple and efficient manner. However, the rear surface 17 of the structural layer 2 may alternatively be free from adhesive coating within the tear strip area 13 or the adhesive coating 18 may have been rendered non-adhesive within the tear strip area 13, as disclosed herein.

The adhesive coating 18 is arranged to provide non-removable attachment of the container lid attachment area 11 and the container base attachment area 12 to a container lid and a container base, respectively.

Figure 4:
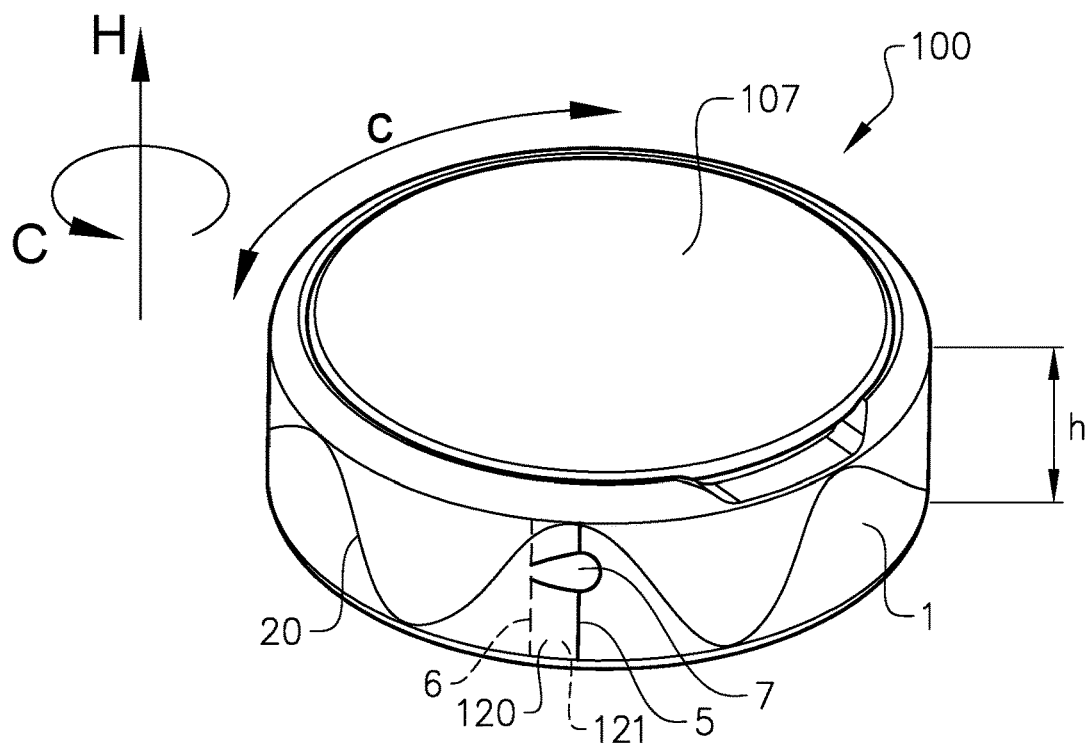
FIG. 4 shows a perspective view of a snuff container with a sealing label as disclosed herein.
Figure 5:
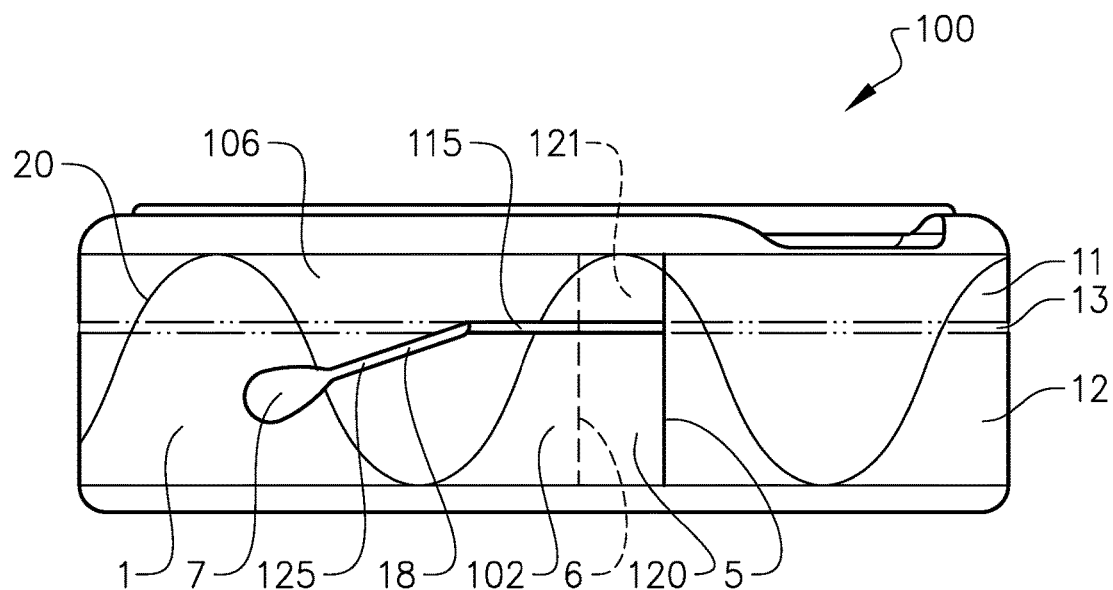
FIG. 5 shows a side view of the snuff container in FIG. 4 with a tear-strip partly torn-away from the sealing label.
Figure 6:
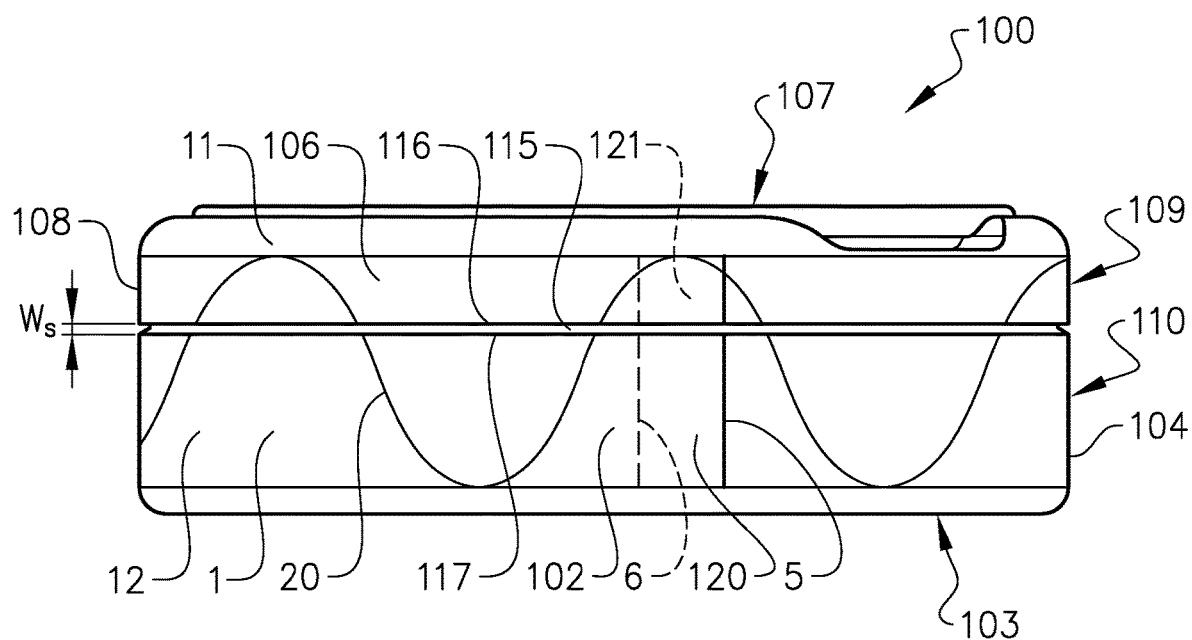
FIG. 6 shows the snuff container in FIG. 5 with the tear-strip completely torn-away from the sealing label.

The front surface 16 of the sealing label 1 may carry decorative and/or informational print, pigmentation etc. as illustrated by the sinus-shaped wave 20 shown in FIGS. 4-6.

Figure 3:
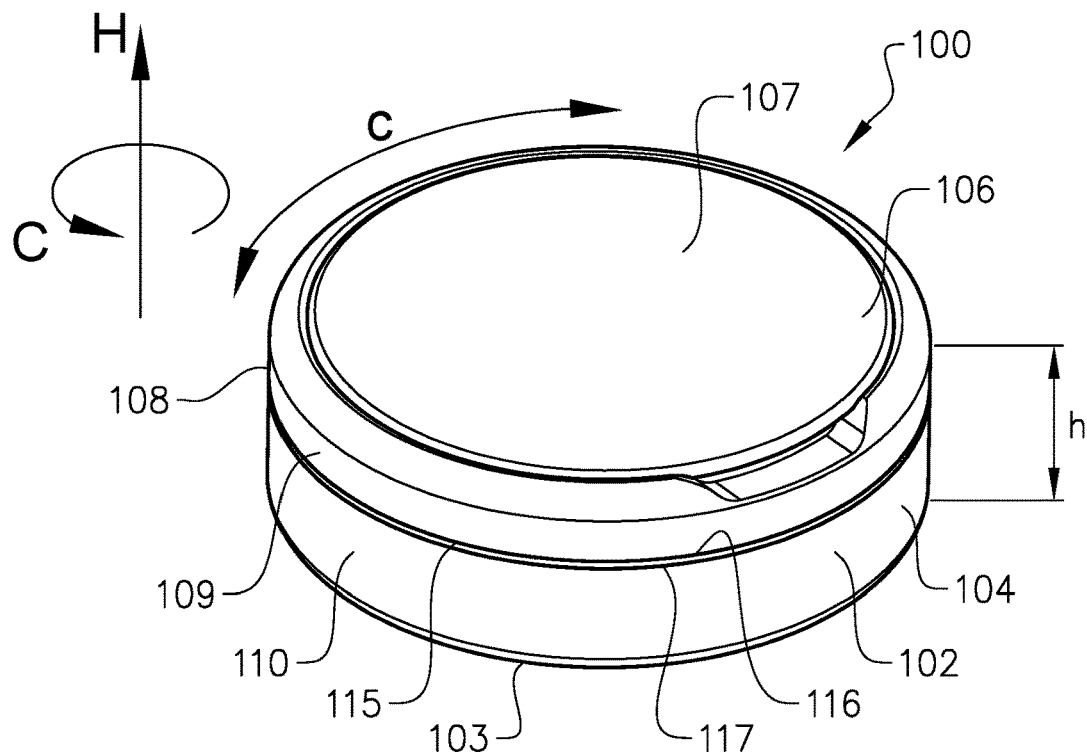
FIG. 3 shows a snuff container without a sealing label.

The snuff container 100 which is shown in FIGS. 3-6 has a height h in a height direction H and a circumference c in a circumferential direction C in a plane perpendicular to the height direction H. The snuff container 100 is shown in FIG. 3 without a sealing label 1 and is shown in FIGS. 4-6 with a sealing label 1 as set out herein.

With particular reference to FIGS. 3 and 6, the snuff container 100 comprises a container base 102 having a bottom wall 103 and a base side wall 104 and a container lid 106 having a top wall 107 and a lid side wall 108. The container lid 106 is removably attached to the container base 102 whereby the snuff container 100 can be repeatedly opened in order to gain access to the interior of the snuff container 100 and be reclosed after opening. When the snuff container 100 is closed, the outer surface 109 of the lid side wall 108 is aligned with the outer surface 110 of the base side wall 104. A split-line 115 is arranged between the lower edge 116 of the lid side wall 108 and the upper edge 117 of the base side wall 104. The split-line 115 extends in the circumferential direction C along the full circumference c of the snuff container 1 and forms a narrow gap between the lid side wall 108 and the base side wall 104. As set out herein, the split-line 115 may have a width $W_S$ in the height direction H of the snuff container 100 of from 0.1 to 3 millimeters, such as from 0.5 millimeters to 2.5 millimeters, such as from 0.7 millimeters to 1.5 millimeters.

The sealing label 100 is attached to the snuff container 100 with the length direction L of the sealing label 1 coinciding with the circumferential direction C of the snuff container and with the height direction H of the snuff container coinciding with the width direction W of the sealing label 1. The sealing label 100 is attached to the snuff container 100 with the container lid attachment area 11 of the sealing label 1 overlapping with and being attached to the lid side wall 108, the container base attachment area 12 overlapping with and being attached to the base side wall 104 and with the tear strip area 13 covering the split line 115 between the lower edge 116 of the lid side wall 108 and the upper edge 117 of the base side wall 104. As the split-line 115 forms a gap between the lower edge 116 of the lid side wall 108 and the upper edge 117 of the base side wall 104, the sealing label 1 extends across the gap and is not attached to the snuff container 100 within the tear strip area 13.

The sealing label 100 of the snuff container 100 which is shown in FIGS. 4-6 is attached to the snuff container 100 with a portion 120 of the sealing label 1 at the first end edge 5 of the sealing label 1 overlapping with a portion 121 of the sealing label 1 at the second end edge 6 of the sealing label 1. The overlap may be larger or smaller than what is illustrated in the figures. Although an overlap between the end portions 120, 121 of the sealing label 1 may be preferred for reasons of providing a tight transport seal of the snuff container 100, it is contemplated within the scope of the invention to attach the sealing label 100 without an overlap. As is illustrated by FIG. 4, the overlap between the end portions 120, 121 of the sealing label 1 is preferably sufficiently large to cover the tear initiation cuts 14, 15 of the pull tab 7.

In the example illustrated in FIGS. 4-6, the sealing label 1 has a width which corresponds to approximately 75% of the height h of the snuff container 100 and 100% of the combined height of the lid side wall 108, the base side wall 104 and the split-line 115. As disclosed herein, the width of the sealing label may be 60-100% of the height of the snuff container 100. As set out herein, a wide sealing label is beneficial as it provides a large display area. A wide sealing label may also offer better sealing of the snuff container 1 in particular when combined with a continuous adhesive coating 18 on the rear surface 17 of the sealing label 1 as the adhesive may contribute to forming a good seal in a direction along the lid side wall 108 and the base side wall 104. A continuous adhesive coating 18 may form a moisture and gas barrier between the sealing label 1 and the snuff container 100 in the height direction H of the snuff container 100.

The snuff container 100 is opened by breaking the seal formed by the sealing label 1. The sealing label 1 is broken by pulling the pull-tab 7 away from the first end edge 5 of the sealing label 1 in the circumferential direction C of the snuff container 100, i.e. in the length direction L of the sealing label 1. Pulling the pull-tab 7 away from the first end edge 5 of the sealing label 1 will cause the mono-oriented polymer film of the structural layer 2 to tear in a controlled manner along the edges of the tear strip area 13, as shown in FIG. 5. Correct initial tearing of the sealing label is aided by the provision of the tear initiation cuts 14, 15. Continued correct tearing along the circumference c of the snuff container 100 is believed to be promoted by the tear strip area 13 being non-attached to the snuff container 100 at the split-line 115 while the adjoining lid attachment area 11 and base attachment area 12 are firmly attached to the side walls 104, 108 of the container base 102 and the container lid 106. The end edges 116, 117 of the side walls 104, 108 which extend in the direction of orientation of the mono-oriented polymer film of the structural layer 2 of the sealing label 1 and which defines the edges of the attached areas and the non-attached area of the sealing label 1 are believed to serve as tear guides and to promote correct tearing away of the tear strip area 13 from the sealing label 1.

In FIG. 5, the snuff container 100 with the sealing label 1 is shown with the tear strip area 13 partly torn away and forming a tear strip 125. The tear strip 125 is shown folded back on the sealing label 1 with the adhesive coating 18 exposed. In the part of the sealing label 1 where the tear strip area 13 has been removed, the split-line 115 is visible between the container lid 106 and the container base 102.

FIG. 6 shows the snuff container 100 with the tear strip 125 fully removed and the split-line 115 between the container lid 106 and the container base 102 fully exposed to allow opening of the snuff container 100. In the illustrated embodiment, the split-line 115 is arranged somewhat above a circumferential center line whereby the container base 102 has a height which is greater than the height of the container lid 106. The location of the split-line 115 may be different from that shown in the figures, implying that the split-line 115 may divide the snuff container 100 in equal parts or such that the container lid has a height which is greater than the height of the container base 102.

As set out herein, the sealing label 1 serves as a display area for the snuff container 100 and it is preferred that the parts of the sealing label 1 which remain on the snuff container 100 constitute a major part of the un-broken sealing label 1. Accordingly, the tear strip area 13 preferably constitutes from 2% to 20% of a combined area of the tear strip area 13, the lid attachment area 11 and the base attachment area 12, such as from 5% to 15% of a combined area of the tear strip area 13, the lid attachment area 11 and the base attachment area 12 or from 7% to 10% of a combined area of the tear strip area 13, the lid attachment area 11 and the base attachment area 12.

The width of the tear strip area 13 may be from 0.5 millimeters to 3 millimeters, such as from 0.7 millimeters to 2.5 millimeters or from 1 millimeter to 1.5 millimeters. The width of the tear strip area 13 is preferably equal to the width of the split-line 115 between the lower edge 116 of the lid side wall 108 and the upper edge 117 of the base side wall 104.

A large remaining display area, i.e. a narrow tear strip 125 makes it possible to provide the snuff container 100 with print which will appear largely unaffected by removal of the tear strip 125, as illustrated by the sinus-wave pattern on the sealing label 1 in FIGS. 4-6.

What is claimed is:
1. A snuff container comprising:
   a height in a height direction and a circumference in a circumferential direction in a plane perpendicular to the height direction;
   a container base having a bottom wall and a base side wall;
   a container lid having a top wall and a lid side wall, the container lid being removably attached to the container base with an outer surface of the lid side wall aligned with an outer surface of the base side wall;

a split-line located between a lower edge of the lid side wall and an upper edge of the base side wall, the split-line extending in the circumferential direction of the snuff container;

a sealing label for sealing the snuff container, wherein the sealing label is attached to the snuff container with a length direction of the sealing label coinciding with the circumferential direction of the snuff container and a height direction of the snuff container coinciding with the width direction of the sealing label, the sealing label comprising:

a structural layer having a first side edge and second side edge extending in the length direction and a first end edge and second end edge extending in the width direction;

the sealing label being divided in the width direction into a container lid attachment area being attached to the lid side wall and a container base attachment area being attached to the base side wall;

a tear strip area positioned between the container lid attachment area and the container base attachment area, the tear strip area terminating at a pull tab positioned at the first end edge, the tear strip area completely covering the split line between the lower edge of the lid side wall and the upper edge of the base side wall;

the sealing label having a length in the length direction, a width in the width direction, and a ratio between the length and the width between 7 and 25;

wherein the structural layer consists of a mono oriented polymer film having a direction of orientation coinciding with the length direction of the sealing label, the structural layer of the sealing label being a single structural layer of the sealing label; and wherein the split-line between the lower edge of said lid side wall and the upper edge of the base side wall has a width in the height direction of the snuff container of from 0.5 to 2.5 millimeters, and a width of the tear strip area of the sealing label is from 0.5 millimeters to 2.5 millimeters, wherein the tear strip area has the same width as the split-line or is at most 0.7 millimeters wider than the split line.

2. The snuff container of claim 1, wherein an adhesive coating is disposed on a rear surface of the structural layer of the sealing label and covers the container lid attachment area and the container base attachment area, the adhesive coating configured to provide non-removable attachment of the container lid attachment area and the container base attachment area to a container lid and a container base, respectively.

3. The snuff container of claim 2, wherein the adhesive coating of said sealing label includes a continuous layer of adhesive on the container lid attachment area and on the container base attachment area.

4. The snuff container of claim 3, wherein the continuous adhesive coating of said sealing label is disposed on the tear strip area.

5. The snuff container of claim 2, wherein the rear surface of the structural layer of said sealing label is free from the adhesive coating within the tear strip area or wherein the adhesive coating has been rendered non-adhesive within the tear strip area.

6. The snuff container of claim 1, wherein the length of the sealing label is between 80 millimeters to 250 millimeters and the width of the sealing label is between 10 millimeters to 25 millimeters.

7. The snuff container of claim 1, wherein a plurality of tear initiation cuts are located in the structural layer on each side of the pull tab at the first end edge of the sealing label.

8. The snuff container of claim 1, wherein the tear strip area of said sealing label constitutes from 2% to 20% of a combined area of the tear strip area, lid attachment area and base attachment area.

9. The snuff container of claim 1, wherein a front surface of the sealing label contains a printed feature extending partly in the lid attachment area and partly in the base attachment area.

10. The snuff container of claim 1, wherein a portion of the sealing label at the first end edge of the sealing label overlaps with a portion of the sealing label at the second end edge of the sealing label.

11. The snuff container of claim 1, wherein the width of the sealing label is 60-100% of the height of the snuff container.

12. The snuff container of claim 1, wherein the snuff container has a cylindrical shape.

13. The snuff container of claim 1, wherein the split-line comprises a gap between the container lid and the container base.

14. The snuff container of claim 1, wherein a continuous adhesive coating applied at least over the container lid attachment area and the container base attachment area forms a moisture and gas barrier between the sealing label and the snuff container in the width direction of the sealing label.

* * * * *